(12) United States Patent
Wang et al.

(10) Patent No.: US 12,293,439 B2
(45) Date of Patent: May 6, 2025

(54) METHOD, ELECTRONIC DEVICE, AND COMPUTER PROGRAM PRODUCT FOR IMAGE PROCESSING

(71) Applicant: Dell Products L.P., Round Rock, TX (US)

(72) Inventors: Zijia Wang, Weifang (CN); Jiacheng Ni, Shanghai (CN); Jinpeng Liu, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 312 days.

(21) Appl. No.: 18/115,249

(22) Filed: Feb. 28, 2023

(65) Prior Publication Data

US 2024/0242402 A1    Jul. 18, 2024

(30) Foreign Application Priority Data

Jan. 16, 2023  (CN) .......................... 202310077813.X

(51) Int. Cl.
  G06T 11/20 (2006.01)
  G06T 7/73 (2017.01)
  H04R 1/40 (2006.01)
  H04R 3/00 (2006.01)

(52) U.S. Cl.
  CPC .............. G06T 11/206 (2013.01); G06T 7/73 (2017.01); H04R 1/406 (2013.01); H04R 3/005 (2013.01); *G06T 2207/30232* (2013.01); *H04R 2201/401* (2013.01)

(58) Field of Classification Search
  CPC ......... G06T 11/206; G06T 7/73; H04R 1/406; H04R 3/005
  USPC ......................................... 381/56, 58, 77, 57
  See application file for complete search history.

(56) References Cited

U.S. PATENT DOCUMENTS

2023/0053106 A1*  2/2023  Roel-Chapa ....... G01C 21/1652

OTHER PUBLICATIONS

C.-C. Lee et al., "Crossing You in Style: Cross-modal Style Transfer from Music to Visual Arts," arXiv:2009.08083v1, Sep. 17, 2020, 9 pages.
T. Karras et al., "A Style-Based Generator Architecture for Generative Adversarial Networks," IEEE/CVF Conference on Computer Vision and Pattern Recognition, Jun. 2019, pp. 4401-4410.

(Continued)

*Primary Examiner* — Thjuan K Addy
(74) *Attorney, Agent, or Firm* — Ryan, Mason & Lewis, LLP

(57) ABSTRACT

A method in an illustrative embodiment comprises collecting a plurality of audio signals from a plurality of sensors, and combining the plurality of audio signals to generate synthetic audio, wherein the plurality of sensors are located at different locations in the same space, and the plurality of audio signals each have a location identifier. The method further comprises analyzing the synthetic audio to find an audio subset in the plurality of audio signals, and extracting first image features of a first image of the space. The method further comprises modifying the first image features based on the location identifiers of the audio signals in the audio subset to generate second image features, and generating a second image of the space based on the second image features.

20 Claims, 6 Drawing Sheets

(56) References Cited

OTHER PUBLICATIONS

D. Jeong et al., "TräumerAI: Dreaming Music with StyleGAN," arXiv:2102.04680v1, Feb. 9, 2021, 6 pages.
H. Brouwer, "Audio-reactive Latent Interpolations with StyleGAN," 2020 Workshop on Machine Learning for Creativity and Design, vol. 3, Dec. 2020, 7 pages.
A. Radford et al., "Learning Transferable Visual Models From Natural Language Supervision," International Conference on Machine Learning, arXiv:2103.00020v1, Feb. 26, 2021, 48 pages.
A. Van Den Oord et al., "Representation Learning with Contrastive Predictive Coding," arXiv:1807.03748v2, Jan. 22, 2019, 13 pages.
O. Patashnik et al., "StyleCLIP: Text-Driven Manipulation of StyleGAN Imagery," arXiv:2103.17249v1, Mar. 31, 2021, 18 pages.
T. Miyato et al., "Spectral Normalization for Generative Adversarial Networks," arXiv:1802.05957v1, Feb. 16, 2018, 26 pages.
H.-H. Wu et al., "Wav2CLIP: Learning Robust Audio Representations from CLIP," arXiv:2110.11499v2, Feb. 15, 2022, 5 pages.
A. Guzhov et al., "AudioCLIP: Extending CLIP to Image, Text and Audio," arXiv:2106.13043v1, Jun. 24, 2021, 14 pages.
K. J. Piczak, "ESC: Dataset for Environmental Sound Classification," Proceedings of the 23rd ACM International Conference on Multimedia, Oct. 2015, pp. 1015-1018.
J. Salamon et al., "A Dataset and Taxonomy for Urban Sound Research," Proceedings of the 22nd ACM International Conference on Multimedia,, Nov. 2014, pp. 1041-1044.

\* cited by examiner

METHOD, ELECTRONIC DEVICE, AND COMPUTER PROGRAM PRODUCT FOR IMAGE PROCESSING

RELATED APPLICATION

The present application claims priority to Chinese Patent Application No. 202310077813.X, filed Jan. 16, 2023, and entitled "Method, Electronic Device, and Computer Program Product for Image Processing," which is incorporated by reference herein in its entirety.

FIELD

Embodiments of the present disclosure relate to the field of image processing, and in particular, to a method, an electronic device, and a computer program product for processing an image based on audio signals.

BACKGROUND

With the development of Internet of Things technology, digital transformation has received more and more attention, especially in the fields of artificial intelligence, big data, cloud services, and mobile terminals. In addition, research based on ambient intelligence is also included. For example, all locations and objects have sensors, so that all information including status information of devices can be received by sensors and shared in real time based on cloud services. Users can receive such information anytime and anywhere.

SUMMARY

Embodiments of the present disclosure provide a method, an electronic device, and a computer program product for processing an image based on audio signals.

According to a first aspect of the present disclosure, a method for image processing is provided. The method comprises: collecting a plurality of audio signals from a plurality of sensors, wherein the plurality of sensors are located at different locations in the same space, and the plurality of audio signals each have a location identifier; combining the plurality of audio signals to generate synthetic audio; analyzing the synthetic audio to find an audio subset in the plurality of audio signals; extracting first image features of a first image of the space; modifying the first image features based on the location identifiers of the audio signals in the audio subset to generate second image features; and generating a second image of the space based on the second image features.

According to a second aspect of the present disclosure, an electronic device for image processing is provided, comprising: at least one processor; and a memory coupled to the at least one processor and having instructions stored therein, wherein the instructions, when executed by the at least one processor, cause the electronic device to perform actions comprising: collecting a plurality of audio signals from a plurality of sensors, wherein the plurality of sensors are located at different locations in the same space, and the plurality of audio signals each have a location identifier; combining the plurality of audio signals to generate synthetic audio; analyzing the synthetic audio to find an audio subset in the plurality of audio signals; extracting first image features of a first image of the space; modifying the first image features based on the location identifiers of the audio signals in the audio subset to generate second image features; and generating a second image of the space based on the second image features.

According to a third aspect of the present disclosure, a computer program product is provided. The computer program product is tangibly stored on a non-transitory computer-readable medium and comprises machine-executable instructions, wherein the machine-executable instructions, when executed by a machine, cause the machine to perform steps of the method in the first aspect of the present disclosure.

BRIEF DESCRIPTION OF THE DRAWINGS

By description of example embodiments of the present disclosure, provided in more detail herein with reference to the accompanying drawings, the above and other objectives, features, and advantages of the present disclosure will become more apparent. In the example embodiments of the present disclosure, the same reference numerals generally represent the same elements.

DETAILED DESCRIPTION

Figure 1:
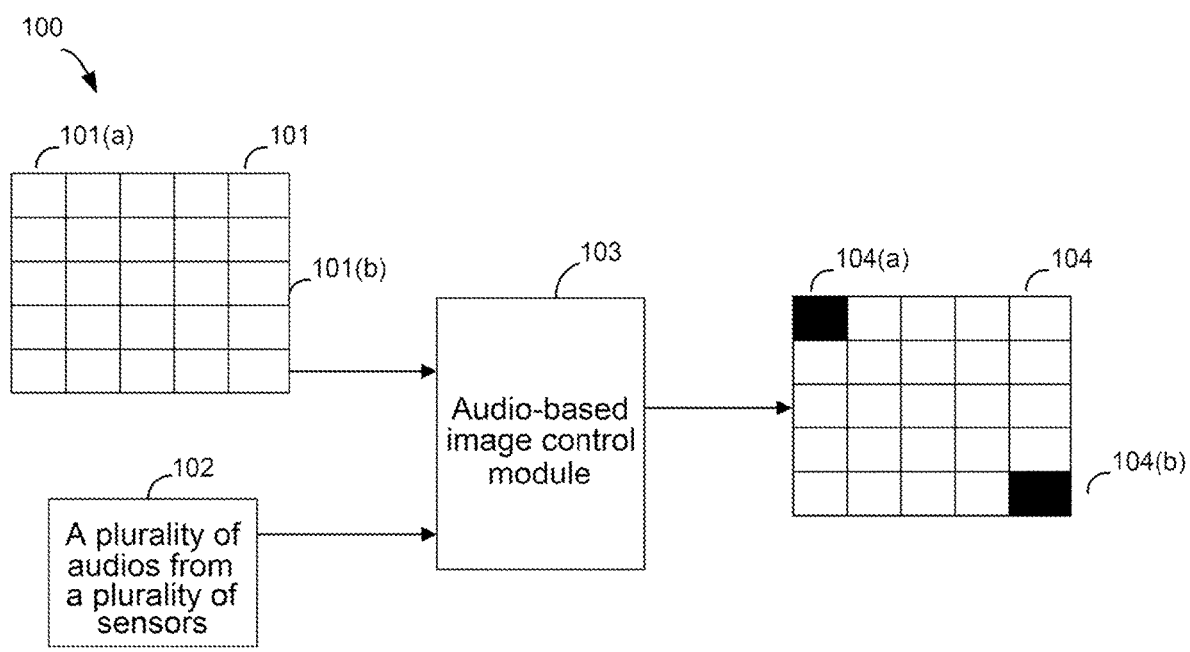
FIG. 1 illustrates a schematic diagram of an example environment in which a device and/or a method according to embodiments of the present disclosure can be implemented.

Illustrative embodiments of the present disclosure will be described in more detail below with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for exemplary purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

With the development of Internet of Things technology, devices in factories, workshops, and other spaces are often equipped with various sensors, which can be used for monitoring the operating statuses of a plurality of devices in real time, such as whether fans of the devices run normally or not, whether a person is passing by the devices or not, and whether internal components of the devices run normally or not. Subsequently, the sensors can send monitored abnormal conditions to a cloud platform in time via the network, and a monitoring entity can make timely countermeasures based on these abnormal conditions.

However, information generated by these sensors often has limitations. For example, when the sensors are image/video monitoring sensors which can generate a huge and redundant amount of image/video data, this may eventually result in high network computing cost and transmission cost, data robustness, and other problems. This not only increases the operating cost of enterprises, but also increases the maintenance cost of corresponding devices.

At least to address the above and other potential problems, embodiments of the present disclosure provide a method for image processing. The method comprises collecting a plurality of audio signals from a plurality of sensors, and combining the plurality of audio signals to generate synthetic audio, wherein the plurality of sensors are located at different locations in the same space, and the plurality of audio signals each have a location identifier. The method further comprises analyzing the synthetic audio to find an audio subset in the plurality of audio signals, and extracting first image features of a first image of the space. The method further comprises modifying the first image features based on the location identifiers of the audio signals in the audio subset to generate second image features, and generating a second image of the space based on the second image features. With the method, faulted devices can be identified in an efficient, fast, and cost-saving manner, so that further measures can be taken, such as emergency repair of the faulted devices and timely replacement of the faulted devices.

The above-noted audio signals utilized in illustrative embodiments are also referred to herein as simply respective "audios."

Fundamental principles and several example embodiments of the present disclosure will be described in detail below with reference to the accompanying drawings. FIG. 1 illustrates a schematic diagram of an example environment 100 in which a device and/or a method according to embodiments of the present disclosure can be implemented. It should be understood that the number and arrangement of images, elements, and regions illustrated in FIG. 1 are examples only, and different numbers and different arrangements of images, elements, and regions may be included in example environment 100.

FIG. 1 shows a schematic diagram of example environment 100 including layout diagram 101, a plurality of audios 102 from a plurality of sensors, audio-based image control module 103, and modified layout diagram 104 generated via audio-based image control module 103.

In FIG. 1, layout diagram 101 may correspond to an entire factory map or a spatial distribution diagram in which all devices are mounted. It should be understood that although layout diagram 101 is shown as corresponding to the factory map, this is exemplary only and not a specific limitation to the present disclosure. According to actual application conditions, layout diagram 101 may correspond to places of any size and any type, including but not limited to factories, workshops, industrial parks, shopping malls, office buildings, stations, and parks, and the present disclosure is not limited in this regard.

Layout diagram 101 can be further divided into a plurality of grids, such as 101(a) and 101(b). These grids can represent the locations of devices to be monitored and can be characterized by location identifiers. It should be understood that although FIG. 1 only shows layout diagram 101 with a size of 5×5 locations, this is exemplary only and not a specific limitation to the present disclosure. Layout diagram 101 can be further divided into subspaces of any number and any shape based on actual needs and specific placement locations of devices, and the present disclosure is not limited in this regard. In addition, the device in FIG. 1 can be any known industrial device, including but not limited to machine tools, lathes, milling machines, drilling machines, shearing machines, cutting machine tools, cranes, lifts, electric welding machines, ovens, and drying ovens, and the present disclosure is not limited in this regard.

In the present disclosure, the sensors may be any device capable of receiving and monitoring one or more signals/information, and converting the monitored one or more signals/information into electrical signals or other required information forms for outputting according to certain rules, in order to meet the needs of signal/information transmission and processing. As an example, the sensors in the present disclosure may be audio sensors for monitoring audios, and the present disclosure is not limited in this regard. Additionally or alternatively, the sensors may also be smart sensors, biological sensors, temperature sensors, wireless sensors, and the like. Additionally or alternatively, for example, the sensors may have common capabilities of receiving and sending data requests, real-time data analysis, local data storage, real-time network connectivity, and the like. The sensors can typically also include various types of terminal devices. Examples of the terminal devices include, but are not limited to: desktop computers, laptop computers, smart phones, wearable devices, smart manufacturing devices, smart household devices, Internet of Things devices, and the like.

In FIG. 1, audio-based image control module 103 may be any trained deep learning model with audio recognition capability, including but not limited to a multi-layer perceptron (MLP), a recurrent neural network model, a recursive neural network model, a deep convolutional network model (CNN), a deep generative model (DNN), a generative adversarial network model (GAN), and the like, and the present disclosure is not limited in this regard. In the present disclosure, as an example, audio-based image control module 103 may be a deep learning model based on CLIP ("Contrastive Language-Image Pre-training") and capable of performing audio and video processing. Audio-based image control module 103 can perform training and matching with a large number of image and text pairs from the Internet, and perform noise contrastive estimation, wherein the image and text pairs from the same sample are used as positive examples, and other samples in the same batch are shown as negative examples. Audio-based image control module 103 may include an image generator and an audio encoder for implementing techniques described in the present disclosure. Additionally or alternatively, audio-based image control module 103 may include any type and number of components or elements for technical implementation, and the present disclosure is not limited in this regard.

Sensors distributed at different locations in factories may first receive and record a plurality of audios 102 transmitted from different devices in the factories. Subsequently, the sensors may transmit the recorded plurality of audios 102 and location identifiers representing current locations of the sensors to audio-based image control module 103 over the network.

In response to receiving the plurality of audios 102 and the corresponding location identifiers from the sensors at different locations, audio-based image control module 103 may then combine the plurality of audios 102 to generate synthetic audio. An audio synthesis method may include overlapping a plurality of audios in the same time domain to synthesize a segment of audio. It should be understood that the synthesis method of the present disclosure is for illustrative purposes only, and is not intended to limit the protection scope of the present disclosure. The synthesis method may include any known technology.

Audio-based image control module 103 can analyze the synthetic audio in conjunction with layout diagram 101, so as to find an abnormal audio subset in the plurality of audios, and adaptively modify layout diagram 101 based on the abnormal audio subset. Finally, audio-based image control module 103 can generate modified layout diagram 104 based on these adaptive modifications and layout diagram 101. In layout diagram 104, black blocks 104(*a*) and 104(*b*) represent locations where a device is at fault in operation. Through such implementation, factory employees can identify faulted devices in layout diagram 101 in an efficient, fast, and cost-saving manner, so that further measures can be taken, such as emergency repair of the faulted devices and timely replacement of the faulted devices.

The block diagram of example environment 100 in which embodiments of the present disclosure can be implemented has been described above in conjunction with FIG. 1. A flow chart of method 200 for image processing according to embodiments of the present disclosure will be described below in conjunction with FIG. 2.

Method 200 can be implemented by audio-based image control module 103 in FIG. 1. It should be understood that method 200 can also be performed by other appropriate devices or apparatuses. Method 200 may include additional actions not shown and/or may omit actions shown, and the scope of the present disclosure is not limited in this regard. For ease of description, method 200 will be described with reference to FIG. 1.

Figure 2:
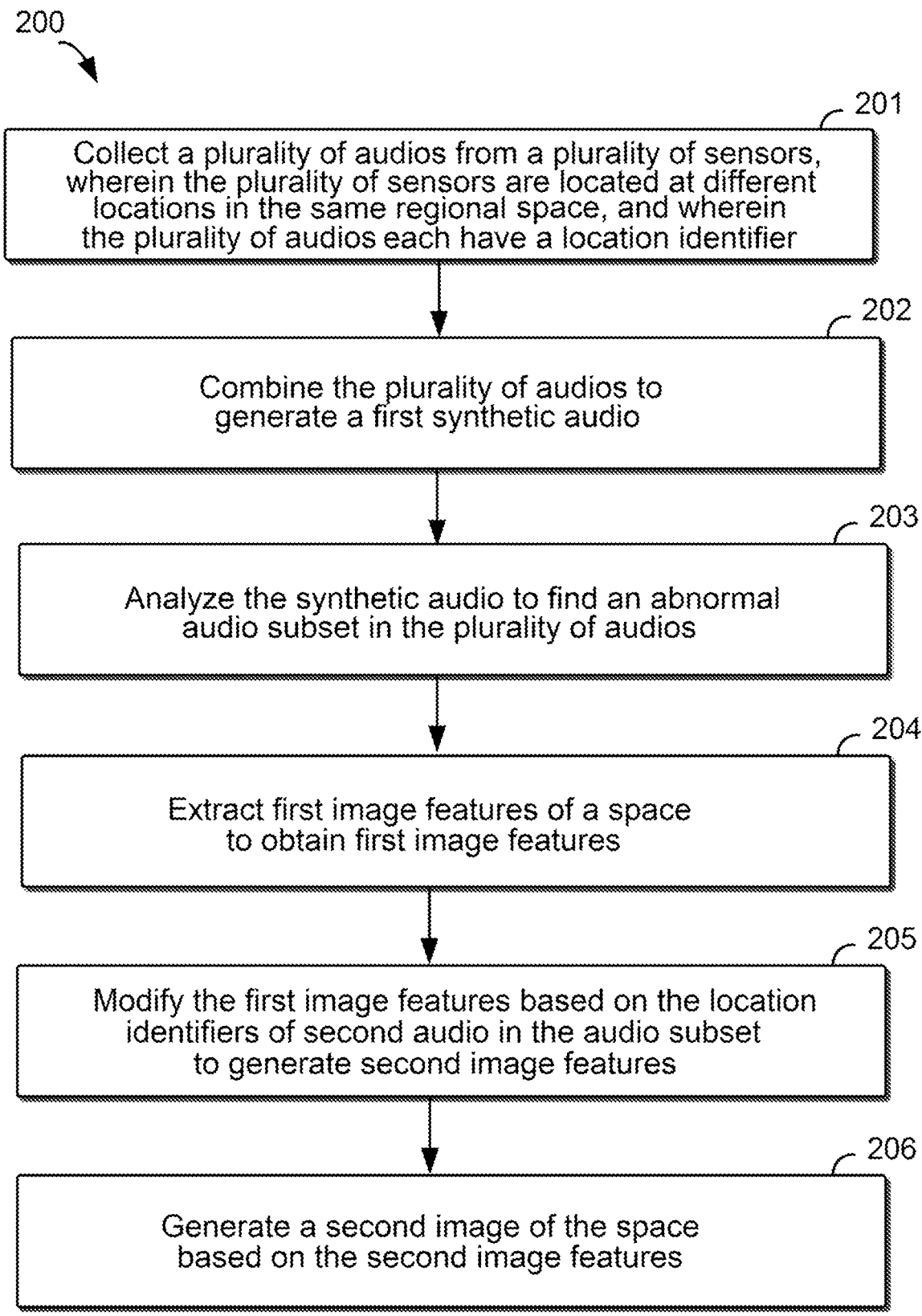
FIG. 2 illustrates a flow chart of a method for image processing according to embodiments of the present disclosure.

As shown in FIG. 2, at block 201, audio-based image control module 103 can first collect a plurality of audios from a plurality of sensors, wherein the plurality of sensors are located at different locations in the same space and the plurality of audios each have a location identifier. As shown in FIG. 1, the plurality of sensors can be located at different locations in the same factory or workshop, and monitor one or more devices at the locations where the sensors are located. For example, the plurality of sensors can collect sound generated by collision of the devices during operation, sound generated by fans during operation of the devices, and any sound that does not correspond to the normal operation of the devices. The plurality of sensors may subsequently transmit the collected plurality of audios to audio-based image control module 103. In some embodiments, the audio encoder in audio-based image control module 103 has been pre-trained based on an image dataset comprising a plurality of images and an audio dataset comprising a plurality of audios.

At block 202, in response to receiving the plurality of audios, audio-based image control module 103 may combine the plurality of audios to generate synthetic audio. The synthetic audio keeps the respective location identifiers in the plurality of audios.

At block 203, audio-based image control module 103 may subsequently analyze the synthetic audio to find an abnormal audio subset in the plurality of audios. The audios in the audio subset may correspond to one or more audios in the plurality of audios before synthesis. In some embodiments, analyzing the synthetic audio to find the abnormal audio subset in the plurality of audios may at least comprise comparing sound decibel levels of the plurality of audios with a predetermined sound decibel threshold, and determining one or more audios with sound decibel levels greater than the predetermined sound decibel threshold in the plurality of audios as the abnormal audio subset by audio-based image control module 103, wherein the predetermined sound decibel threshold is set to different values based on different device types in the same space. For example, in a factory, sound produced by devices in normal operation is 60 decibels, then a user can set 60 decibels as the predetermined sound decibel threshold. Thus, when the sensors receive audios of 120 decibels, audio-based image control module 103 may identify the audios as abnormal audios.

Additionally or alternatively, audio-based image control module 103 may compare audio waveforms of the plurality of audios with a predetermined audio waveform, and determine one or more audios with audio waveforms different from the predetermined audio waveform as the abnormal audio subset, wherein the predetermined audio waveform is set to different audio waveforms based on different device types in the same space. For example, the devices can emit audio waveforms that are nearly sinusoidal. Thus, when audio-based image control module 103 detects that waveforms of the audios from the sensors are cosine audio waveforms, audio-based image control module 103 may identify the audios as abnormal audios.

Additionally or alternatively, audio-based image control module 103 may also compare audio frequencies of the plurality of audios with a predetermined audio frequency, and determine one or more audios with audio frequencies different from the predetermined audio frequency in the plurality of audios as the abnormal audio subset, wherein the predetermined audio frequency is set to different values based on different device types in the same space. For example, in a factory, sound frequency emitted by the devices during normal operation is 70 to 80 Hz. Thus, when the sensors receive audios with the sound frequency of 100 to 120 Hz, audio-based image control module 103 may identify the audios as abnormal audios. It should be understood that the methods for finding abnormal audios listed in the present disclosure are exemplary only and not a specific limitation to the present disclosure. According to actual application situations, a method for finding abnormal audios in any manner can be included, and the present disclosure is not limited in this regard.

At block 204, audio-based image control module 103 may then extract first image features of layout diagram 101 of a space, wherein layout diagram 101 may correspond to the space. The grids such as 101(*a*) and 101(*b*) in layout diagram 101 can represent the specific locations of devices to be monitored and sensors, and these specific locations can be characterized by location identifiers. The space can be a factory, a workshop, an industrial park, and other places, and the present disclosure is not limited in this regard. Additionally or alternatively, layout diagram 101 may also correspond to one or more portions of these places.

At block 205, audio-based image control module 103 may modify the first image features of layout diagram 101 based on the location identifiers of the audios in the audio subset including one or more abnormal audios to generate second image features. For example, audio-based image control module 103 may identify one or more features of the first image features that are located at abnormal device locations.

In some embodiments, since both the image features of the images and the audio features of the audios include embedding vectors, modifying the first image features based on the location identifiers of the audios in the audio subset to generate the second image features may further comprise minimizing the differences between the embedding vectors of the second image features and the embedding vector of the synthetic audio in a process of generating the second image features by audio-based image control module 103. In this way, it can be ensured that the difference between modified layout diagram 104 and layout diagram 101 is as small as possible, thereby improving the accuracy of identifying the locations of abnormal devices.

In some embodiments, modifying the first image features based on the location identifiers of the audios in the audio subset to generate the second image features may further comprise minimizing the difference between modified layout diagram 104 and layout diagram 101 in a process of generating modified layout diagram 104 by audio-based image control module 103. In this way, it can be ensured that only the locations of the abnormal devices are identified, while other locations remain unchanged.

In some embodiments, modifying the first image features based on the location identifiers of the audios in the audio subset to generate the second image features may further comprise minimizing the differences between the second image features and the first image features by adjusting implicit vectors of the second image features to be close to implicit vectors of the first image features in a process of generating the second image features by audio-based image control module 103.

At block 206, audio-based image control module 103 may generate a second image of the space based on the second image features. In FIG. 1, the second image may be modified layout diagram 104. Compared with original layout diagram 101, modified layout diagram 104 has one or more black blocks 104(a) and 104(b) that identify regions where the abnormal devices are located. Management personnel of factories or workshops can take corresponding measures for the abnormal devices based on modified layout diagram 104, such as rush repair or timely replacement of the abnormal devices, thereby reducing enterprise operating cost and maintenance cost of corresponding devices. According to the method described in the present disclosure, high network computing cost and transmission cost can also be reduced, while data robustness can be enhanced.

Additionally or alternatively, in some embodiments, audio-based image control module 103 may also extract image features of modified layout diagram 104 in response to generating modified layout diagram 104; generate second audio by audio-based image control module 103 based on the image features of modified layout diagram 104; compare the second audio with synthetic audio; and in response to a decibel level of the second audio being greater than that of the synthetic audio, or an audio waveform of the second audio being different from an audio waveform of the synthetic audio, or an audio frequency of the second audio being different from an audio frequency of the synthetic audio, retrain audio-based image control module 103.

Additionally or alternatively, in some embodiments, a user can apply different weights to the first image features of layout diagram 101 based on factors such as the importance of the devices, so that whether the devices that the user is concerned about are in normal operating states or not can appear in modified layout diagram 104 more timely.

It should be understood that the method described above for determining the locations of the abnormal devices is exemplary only, and is not intended to limit the scope of the present disclosure. Any suitable method may be used for determining the locations of the abnormal devices.

The method for identifying the regions where the abnormal devices are located based on the audios has been described above in conjunction with the trained model of the present disclosure. However, currently known models cannot accurately identify the regions where the abnormal devices are located. Thus, a model needs to be pre-trained to implement the method described in present disclosure. A process of pre-training a CLIP model and an audio encoder will be described below with reference to FIG. 3A and FIG. 3B.

Figure 3A:
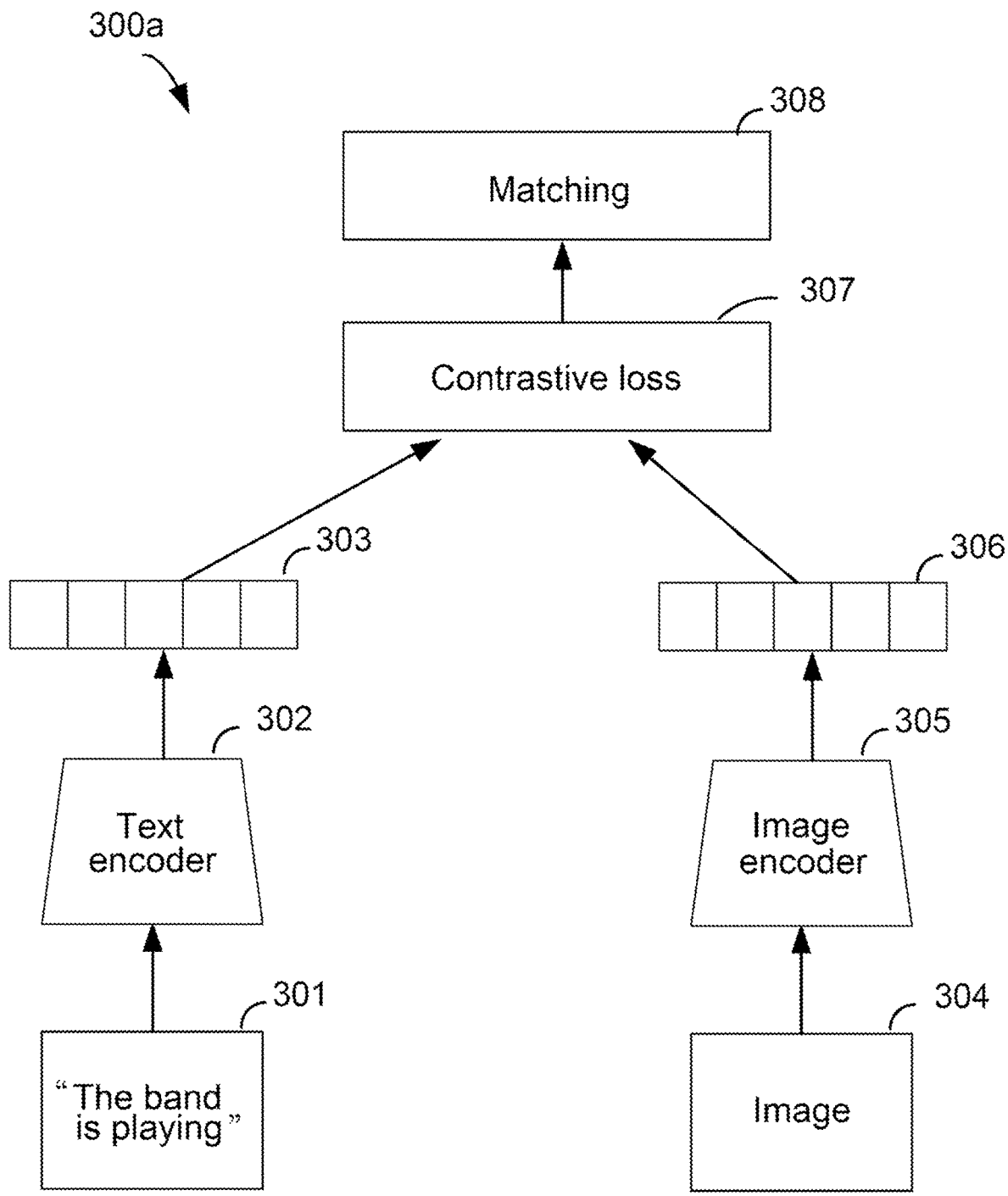
FIG. 3A illustrates a schematic diagram of a process of pre-training a CLIP model according to embodiments of the present disclosure.

In FIG. 3A, which illustrates process portion 300a, text encoder 302 may firstly encode text 301 such as "the band is playing," so as to obtain text features 303 in the text. Meanwhile, image encoder 305 may extract image features 306 of image 304. Then, the CLIP model can project text features 303 and image features 306 into the same shared embedded space. In addition, the distances between matched image features 306 and text features 303 are reduced, while the distances between unmatched image features 306 and text features 303 are increased by a method of contrastive loss 307, thereby finally obtaining text and image matching 308.

The method in some embodiments is configured such that natural language can serve as a flexible prediction space to help generalize and transfer knowledge, and the continuous concept space of images is mapped to the discrete symbol space of texts. Therefore, CLIP has been applied to tasks such as zero-shot classification and cross-modal retrieval with great success, and has been extended to cross-modal generation.

Figure 3B:
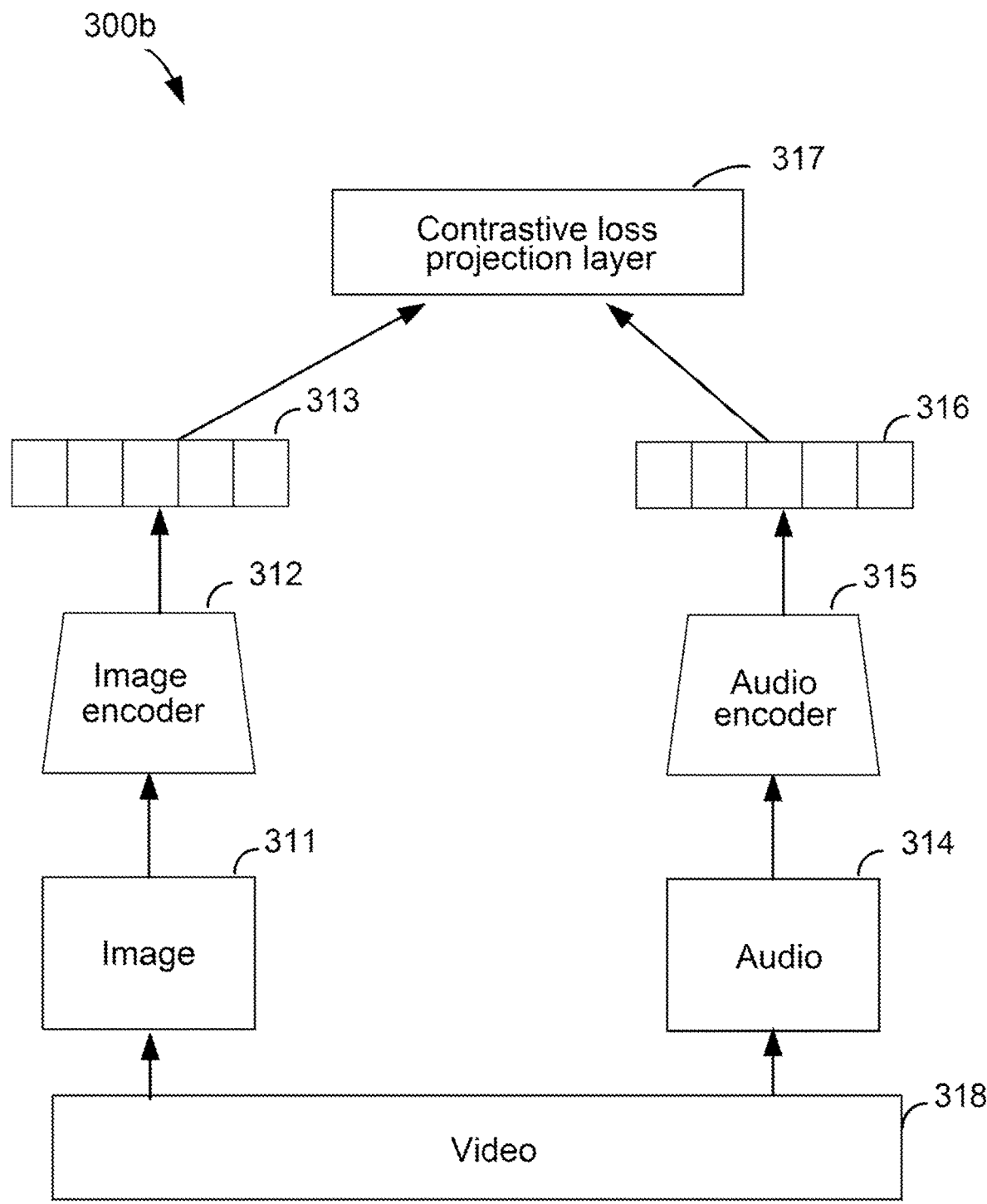
FIG. 3B illustrates a schematic diagram of a process of pre-training an audio encoder according to embodiments of the present disclosure.

On the basis of FIG. 3A, in FIG. 3B, which illustrates process portion 300b, the CLIP model can further pre-train audio encoder 315 through video extraction and CLIP image embedding. The CLIP model may first extract image set 311 and audio set 314 from video 318 respectively. Subsequently, image encoder 312 may extract image features 313 of image set 311, and audio encoder 315 may extract audio features 316 of audio set 314. Image features 313 and audio features 316 may be fed into contrastive loss projection layer 317 for matching.

Compared with contrastive loss 307 in FIG. 3A, contrastive loss projection layer 317 adds a multi-layer perceptron (MLP) as a projection layer. Therefore, a loss function (C×Loss) across the projection layer can be defined as C×Loss=L(f(Image); Audio)+L(Image; g(Audio)), where Image represents image features, Audio represents audio features, f and g represent projection functions, and L represents contrastive loss.

The method facilitates stabilization of the extraction process. The additional trainable MLP layer can add flexibility. The method also enhances the modality consistency, since learned audio embedding features can be used for recovering CLIP image embedding features through the projection layer. By extraction, weights of an original CLIP model are kept unchanged. After pre-training, the audio encoder can be used as a feature extractor, and additional layers can be trained to fulfill downstream tasks.

A process of generating a second image with an audio-based image control module including an image generator and an audio encoder and further training the audio encoder will be described below in conjunction with FIG. 4.

Figure 4:
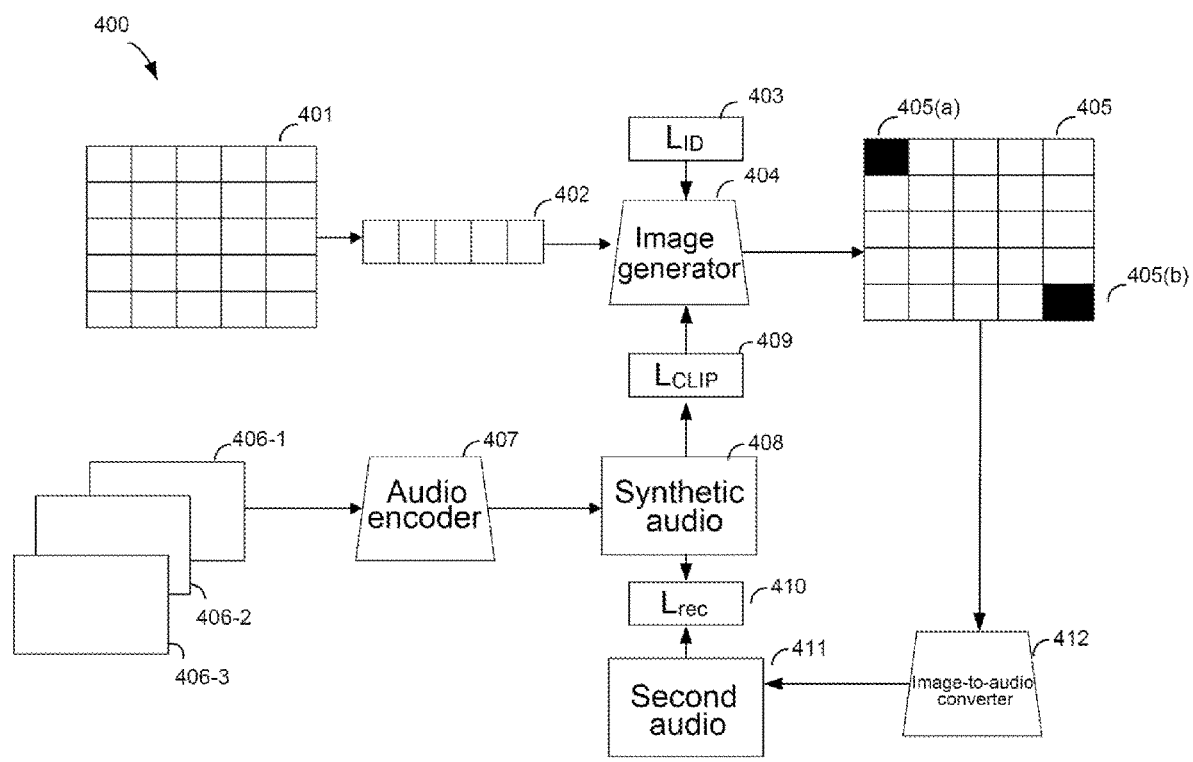
FIG. 4 illustrates a schematic diagram of a process of generating a second image with an audio-based image control module including an image generator and an audio encoder and further training the audio encoder according to embodiments of the present disclosure.

Audio-based image control module 103 can extract image features 402 of layout diagram 401 in process 400 of FIG. 4 and input image features 402 into image generator 404. Meanwhile, a plurality of audios including audio 406-1, audio 406-2, and audio 406-3 may be encoded by audio encoder 407 to generate synthetic audio 408. In a process of generating modified layout diagram 405, audio-based image control module 103 can minimize cosine distance $d_{cosine}(G(W_a), a)$ of the embedding vectors between image features 402 and audio features of synthetic audio 408, illustratively at least in part via CLIP loss function $\mathcal{L}_{CLIP}$ 409, thereby minimizing the difference between layout diagram 401 and modified layout diagram 405 except for regions where abnormal devices 405(a) and 405(b) are located.

The above technique can be expressed by the following formula (1):

$$\mathcal{L}_{man} = \underset{w_a \in W+}{\mathrm{argmin}}\, d_{cosine}(G(w_a), a) + \lambda_{ID}\mathcal{L}_{ID}(w_a) + \lambda_{sim}\|g\cdot(w_a - w_s)\|_2 \quad (1)$$

where G represents image generator 404, and in this example, image generator 404 may be a generator based on Style-GAN, and the present disclosure is not limited in this regard; $w_s \in W$ represents image features 402 in layout diagram 401 (intermediate implicit vectors in Style-GAN); $w_a \in W+$ represents audio features (implicit vectors) of synthetic audio 408; g represents a trainable vector (weight) used for masking a particular training layer; $\mathcal{L}_{ID}$ 403 is an identity loss function; $\lambda_{sim}$ is a hyper-parameter for controlling the strength of a similarity loss term; $\lambda_{ID}$ is a hyper-parameter for controlling the strength of identity loss function $\mathcal{L}_{ID}$ 403; and $\lambda_{sim}$ and $\lambda_{ID}$ with a high value can maintain the contents of layout diagram 401, while those with a low value do not. Image features $w_s$ also represent implicit vectors randomly generated from image generator 404 or implicit vectors obtained from existing images through GAN transposition.

The similarity between layout diagram 401 and modified layout diagram 405 can be controlled by identity loss function $\mathcal{L}_{ID}$ 403, and $\mathcal{L}_{ID}$ can be expressed by the following formula:

$$\mathcal{L}_{ID}(w_a) = 1 - \langle R(G(w_s)), R(G(w_a)) \rangle \quad (2)$$

where R represents a pre-trained feature extraction model (such as ArcFace), $G(w_s)$ represents an image generated based on image features 402, and $G(w_a)$ represents an image generated based on synthetic audio 408. Function $\mathcal{L}_{ID}$ 403 can minimize cosine distance ($R(G(w_s))$, $R(G(w_a))$) between the parameters in the implicit vectors. It should be noted that for other modifications to the images, the identity loss function can be disabled by setting $\lambda_{ID}=0$.

In image generator 404, the change of image style can also be controlled by adaptive layer masking. $L_2$ regularization can effectively distinguish the image features of the generated image from those of the original image. However, in the Style-GAN model, each layer has different attributes, so if the input attributes provided by the user change, a different weight can be applied to each layer to change the image style. Therefore, complete content information can be kept in style implicit vectors with layer-wise masking. For example, the implicit vectors can be expressed as $w \in \mathbb{R}^{L \times D}$, where L represents the number of model network layers, and D represents the dimension size. Parameter vectors g can be applied to L dimension. In an implicit vector optimization step, g and w are multiplied by each layer, and g can be iteratively updated to adjust the implicit vectors.

Multi-modal manipulation of audios and texts is style mixing based on Style-GAN. The w implicit vectors of different layers in Style-GAN represent different attributes. Since audios and texts share the same new multi-modal embedding space, through selection of specific layers of each implicit vector guided by the audios and the texts, images can be manipulated with the attributes of the audios and the texts.

In order to further strengthen the relationship between the audio features and the corresponding synthetic image, the audio consistency between second audio 411 extracted from modified layout diagram 405 and synthetic audio 408 may also be checked. More specifically, I2A (image-to-audio) converter 412 may be applied. I2A converter 412 has been pre-trained based on training pair $(a_i^m, I_i^m)$, where $a_i^m$ represents audio features, and $I_i^m$ represents corresponding image features. I2A converter 412 may convert modified layout diagram 405 into second audio 411 and extract audio features $\tilde{a}_i^m \in \mathbb{R}^d$ of second audio 411. Furthermore, the audio features $\tilde{a}_i^m \in \mathbb{R}^d$ of second audio 411 may be compared with the audio features of synthetic audio 408 to determine whether synthetic audio 408 is consistent with second audio 411 or not. The method can be expressed by the following formula:

$$\mathcal{L}_{con} = L_2(a, \tilde{a}) \quad (3)$$

where a represents the audio features of synthetic audio 408, and ã represents the audio features of second audio 411. According to the formula, the $L_2$ distance between the audio features of synthetic audio 408 and the audio features of second audio 411 may be calculated.

Comparing the audio features $\tilde{a}_i^m \in \mathbb{R}^d$ of second audio 411 with the audio features of synthetic audio 408 may include but is not limited to: comparing to determine whether the decibel level of the second audio is greater than that of the synthetic audio or not, or comparing to determine whether the audio waveform of the second audio is different from the audio waveform of the synthetic audio or not, or comparing to determine whether the audio frequency of the second audio is different from the audio frequency of the synthetic audio.

If it is finally determined that the audio features of synthetic audio 408 differ greatly from the audio features of second audio 411, further adjustments and optimizations can be made to components such as audio encoder 407, image generator 404, and image-to-audio converter 412, so that difference 410 between the audio features of synthetic audio 408 and the audio features of second audio 411 is minimized. The optimization objective can be expressed by the following formula:

$$\mathcal{L} = \mathcal{L}_{man} + \mathcal{L}_{con} \quad (4)$$

Example models implemented based on the present disclosure are compared with supervised methods and existing zero-shot audio classification methods below (see Table 1 and Table 2).

TABLE 1

| Model | Whether supervision is performed or not | Zero-shot classification | Dataset ESC-50 | Urban sound 8k |
|---|---|---|---|---|
| ResNet50 | ✓ | — | 66.80% | 71.30% |
| The model without $L_{con}$ (linear regression) according to the present disclosure | — | — | 52.70% | 60.30% |
| Model (linear regression) according to the present disclosure | — | — | 79.20% | 69.80% |

TABLE 2

| Model | Whether supervision is performed or not | Zero-shot classification | Dataset ESC-50 | Urban sound 8k |
|---|---|---|---|---|
| Wav2clip | — | ✓ | 41.40% | 40.40% |
| AudioCLIP | — | ✓ | 69.40% | 68.80% |
| Model according to the present disclosure | — | ✓ | 60.20% | 47.90% |

In Table 1, a model such as ResNet50 trained by a supervised method (e.g., logistic regression) can be used as a baseline model, and ResNet50 is supervised by randomly initialized parameters. Then, the audio features generated by ResNet50 on datasets ESC-50 and Urban sound 8k can be compared with the audio features generated by the disclosed model on the same dataset. It can be seen that the audio encoder according to the present disclosure shows better and more accurate image-audio classification performance than the baseline model.

In Table 2, the accuracy of the model according to the present disclosure with respect to zero-shot audio classification is compared with that of Wav2clip and AudioCLIP. The loss function in the model according to the present disclosure learns three modalities in the CLIP embedding space, and richer audio representation is learned by contrastive loss, whereas the Wav2clip model only learns the relationship between audios and a visual context. Although the performance of AudioCLIP in a zero-shot audio classification task is superior to that of the model according to the present disclosure, the comparison between the model according to the present disclosure and AudioCLIP is not fair. This is because AudioCLIP uses pre-trained ESResNeXt as the audio encoder, which is different from the present disclosure. The audio encoder of AudioCLIP has been pre-trained on a large-scale audio dataset, that is, the audio set consists of more than two million audio clips. However, the training of the present disclosure is conducted in an end-to-end manner, and does not require such a huge dataset.

Figure 5:
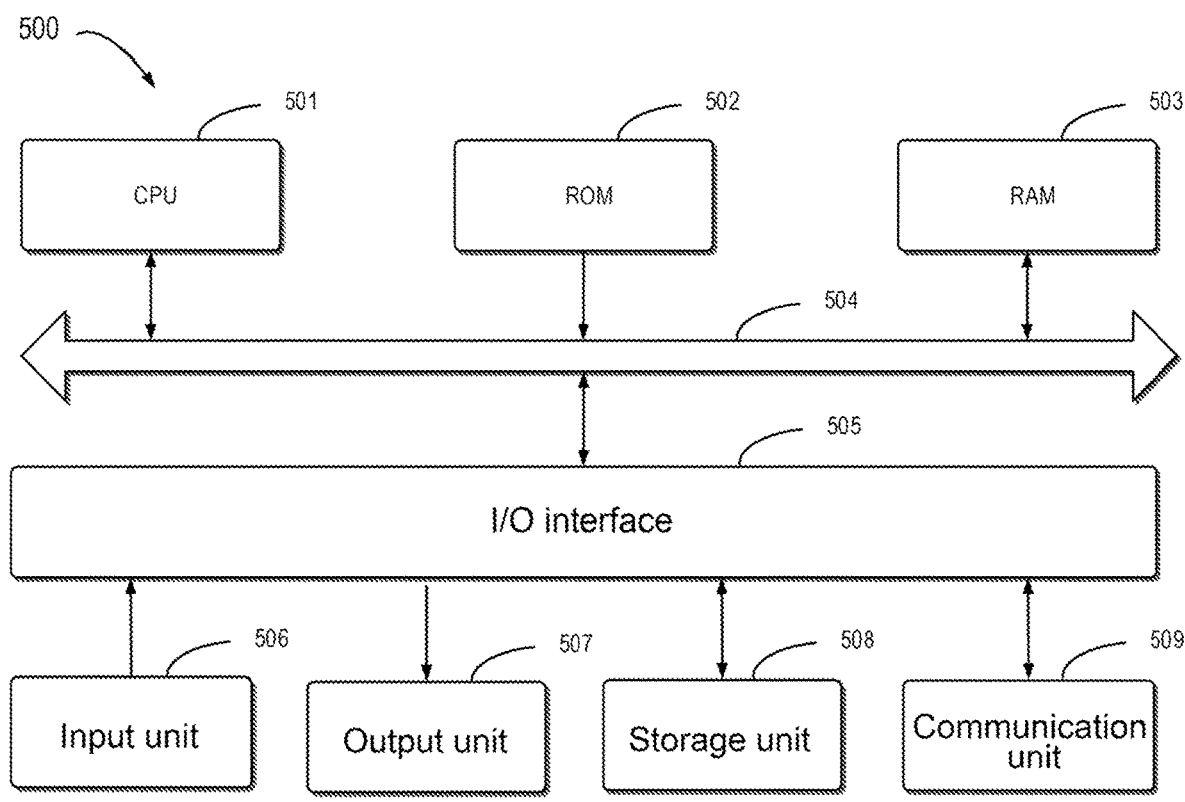
FIG. 5 illustrates a schematic block diagram of an example device suitable for implementing embodiments of the present disclosure.

FIG. 5 is a schematic block diagram of example device 500 that can be used to implement embodiments of the present disclosure. For example, the audio-based image control module 103 in FIG. 1 may be implemented with device 500. As shown in the figure, device 500 includes central processing unit (CPU) 501, which may execute various appropriate actions and processing in accordance with computer program instructions stored in read-only memory (ROM) 502 or computer program instructions loaded from storage unit 508 onto random access memory (RAM) 503. Various programs and data required for operations of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

The various processes and processing described above, such as method 200, may be performed by CPU 501. For example, in some embodiments, method 200 may be implemented as a computer software program that is tangibly contained in a machine-readable medium, such as storage unit 508. In some embodiments, part of or all the computer program may be loaded and/or installed to device 500 via ROM 502 and/or communication unit 509. When the computer program is loaded to RAM 503 and executed by CPU 501, one or more actions of method 200 described above may be executed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the embodiments disclosed herein.

What is claimed is:

1. A method, comprising:
  collecting a plurality of audio signals from a plurality of sensors, wherein the plurality of sensors are located at different locations in the same space, and the plurality of audio signals each have a location identifier;
  combining the plurality of audio signals to generate synthetic audio;
  analyzing the synthetic audio to find an audio subset in the plurality of audio signals;
  extracting first image features of a first image of the space;
  modifying the first image features based on the location identifiers of the audio signals in the audio subset to generate second image features; and
  generating a second image of the space based on the second image features.

2. The method according to claim 1, wherein analyzing the synthetic audio comprises:
  analyzing the synthetic audio with an audio encoder, wherein the audio encoder has been pre-trained based on an image dataset comprising a plurality of images and an audio dataset comprising a plurality of audio signals.

3. The method according to claim 1, wherein finding the audio subset in the plurality of audio signals comprises at least one or more of the following:
- comparing sound decibel levels of the plurality of audio signals with a predetermined sound decibel threshold, and determining one or more audio signals with sound decibel levels greater than the predetermined sound decibel threshold in the plurality of audio signals as the audio subset, wherein the predetermined sound decibel threshold is set to different values based on different device types in the same space;
- comparing audio waveforms of the plurality of audio signals with a predetermined audio waveform, and determining one or more audio signals with audio waveforms different from the predetermined audio waveform as the audio subset, wherein the predetermined audio waveform is set to different audio waveforms based on different device types in the same space; or
- comparing audio frequencies of the plurality of audio signals with a predetermined audio frequency, and determining one or more audio signals with audio frequencies different from the predetermined audio frequency in the plurality of audio signals as the audio subset, wherein the predetermined audio frequency is set to different values based on different device types in the same space.

4. The method according to claim 1, wherein modifying the first image features based on the location identifiers of the audio signals in the audio subset to generate the second image features further comprises:
- in a process of generating the second image features, minimizing the differences between embedding vectors of the second image features and an embedding vector of the synthetic audio.

5. The method according to claim 4, wherein modifying the first image features based on the location identifiers of the audio signals in the audio subset to generate the second image features further comprises:
- in a process of generating the second image, minimizing the difference between the second image and the first image.

6. The method according to claim 1, wherein modifying the first image features based on the location identifiers of the audio signals in the audio subset to generate the second image features further comprises:
- in a process of generating the second image features, minimizing the differences between the second image features and the first image features by adjusting implicit vectors of the second image features to be close to implicit vectors of the first image features.

7. The method according to claim 2, further comprising:
- extracting third image features of the second image in response to generating the second image;
- generating second audio with the audio encoder based on the third image features;
- comparing the second audio with the synthetic audio; and
- in response to a decibel level of the second audio being greater than that of the synthetic audio, or an audio waveform of the second audio being different from an audio waveform of the synthetic audio, or an audio frequency of the second audio being different from an audio frequency of the synthetic audio, retraining the audio encoder.

8. The method according to claim 7, wherein modifying the first image features based on the location identifier of the second audio to generate the second image features further comprises:
- applying different weights to the first image features to generate the second image features.

9. The method according to claim 1, wherein the method is applied to monitor devices running in factories or workshops.

10. An electronic device, comprising:
- at least one processor; and
- a memory coupled to the at least one processor and having instructions stored therein, wherein the instructions, when executed by the at least one processor, cause the electronic device to perform actions comprising:
- collecting a plurality of audio signals from a plurality of sensors, wherein the plurality of sensors are located at different locations in the same space, and the plurality of audio signals each have a location identifier;
- combining the plurality of audio signals to generate synthetic audio;
- analyzing the synthetic audio to find an audio subset in the plurality of audio signals;
- extracting first image features of a first image of the space;
- modifying the first image features based on the location identifiers of the audio signals in the audio subset to generate second image features; and
- generating a second image of the space based on the second image features.

11. The electronic device according to claim 10, wherein analyzing the synthetic audio comprises:
- analyzing the synthetic audio with an audio encoder, wherein the audio encoder has been pre-trained based on an image dataset comprising a plurality of images and an audio dataset comprising a plurality of audio signals.

12. The electronic device according to claim 10, wherein finding the audio subset in the plurality of audio signals comprises at least one or more of the following:
- comparing sound decibel levels of the plurality of audio signals with a predetermined sound decibel threshold, and determining one or more audio signals with sound decibel levels greater than the predetermined sound decibel threshold in the plurality of audio signals as the audio subset, wherein the predetermined sound decibel threshold is set to different values based on different device types in the same space;
- comparing audio waveforms of the plurality of audio signals with a predetermined audio waveform, and determining one or more audio signals with audio waveforms different from the predetermined audio waveform as the audio subset, wherein the predetermined audio waveform is set to different audio waveforms based on different device types in the same space; or
- comparing audio frequencies of the plurality of audio signals with a predetermined audio frequency, and determining one or more audio signals with audio frequencies different from the predetermined audio frequency in the plurality of audio signals as the audio subset, wherein the predetermined audio frequency is set to different values based on different device types in the same space.

13. The electronic device according to claim 10, wherein modifying the first image features based on the location identifiers of the audio signals in the audio subset to generate the second image features further comprises:

in a process of generating the second image features, minimizing the differences between embedding vectors of the second image features and an embedding vector of the synthetic audio.

14. The electronic device according to claim 13, wherein modifying the first image features based on the location identifiers of the audio signals in the audio subset to generate the second image features further comprises:
in a process of generating the second image, minimizing the difference between the second image and the first image.

15. The electronic device according to claim 10, wherein modifying the first image features based on the location identifiers of the audio signals in the audio subset to generate the second image features further comprises:
in a process of generating the second image features, minimizing the differences between the second image features and the first image features by adjusting implicit vectors of the second image features to be close to implicit vectors of the first image features.

16. The electronic device according to claim 11, further comprising:
extracting third image features of the second image in response to generating the second image;
generating second audio with the audio encoder based on the third image features;
comparing the second audio with the synthetic audio; and
in response to a decibel level of the second audio being greater than that of the synthetic audio, or an audio waveform of the second audio being different from an audio waveform of the synthetic audio, or an audio frequency of the second audio being different from an audio frequency of the synthetic audio, retraining the audio encoder.

17. The electronic device according to claim 16, wherein modifying the first image features based on the location identifier of the second audio to generate the second image features further comprises:
applying different weights to the first image features to generate the second image features.

18. The electronic device according to claim 10, wherein the electronic device is configured for monitoring devices running in factories or workshops.

19. A computer program product that is tangibly stored on a non-transitory computer-readable medium and comprises computer-executable instructions, wherein the computer-executable instructions, when executed by a device, cause the device to perform a method, the method comprising:
collecting a plurality of audio signals from a plurality of sensors, wherein the plurality of sensors are located at different locations in the same space, and the plurality of audio signals each have a location identifier;
combining the plurality of audio signals to generate synthetic audio;
analyzing the synthetic audio to find an audio subset in the plurality of audio signals;
extracting first image features of a first image of the space;
modifying the first image features based on the location identifiers of the audio signals in the audio subset to generate second image features; and
generating a second image of the space based on the second image features.

20. The computer program product according to claim 19, wherein analyzing the synthetic audio comprises:
analyzing the synthetic audio with an audio encoder, wherein the audio encoder has been pre-trained based on an image dataset comprising a plurality of images and an audio dataset comprising a plurality of audio signals.

* * * * *